T. SMITH.
Car-Couplings.
No. 141,177. Patented July 22, 1873.
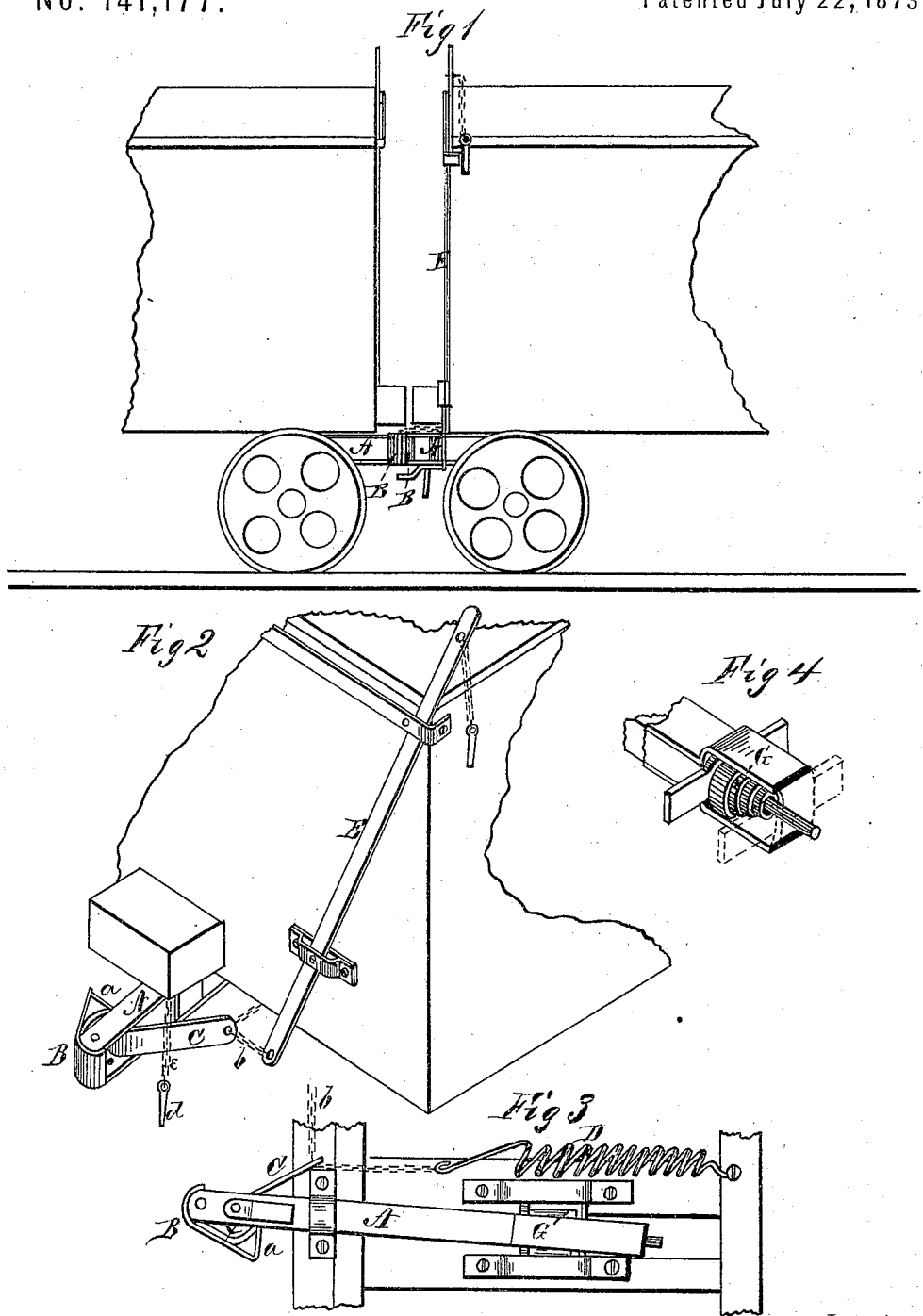

UNITED STATES PATENT OFFICE.

THOMAS SMITH, OF WATERFORD, NEW YORK.

IMPROVEMENT IN CAR-COUPLINGS.

Specification forming part of Letters Patent No. 141,177, dated July 22, 1873; application filed April 3, 1873.

*To all whom it may concern:*

Be it known that I, THOMAS SMITH, of Waterford, in the county of Saratoga and in the State of New York, have invented certain new and useful Improvements in Car-Coupling; and do hereby declare that the following is a full, clear, and exact description thereof, reference being had to the accompanying drawings and to the letters of reference marked thereon making a part of this specification.

The nature of my invention consists in the construction and arrangement of a car-coupling, as will be hereinafter more fully set forth.

In order to enable others skilled in the art to which my invention appertains to make and use the same, I will now proceed to describe its construction and operation, referring to the annexed drawing, in which—

Figure 1 is a side view of my car-coupling, Fig. 2 a perspective view, and Fig. 3 a bottom view, of the same. Fig. 4 is a perspective view of the spring arrangement at the rear end of the bumper.

A represents the bumper, the front end of which is slotted, and in the same is pivoted a hooked head, B. From this head an arm, C, extends through the slot in the bumper to the other side of the same, and this arm is connected with a spring, D, under the car, as shown in Fig. 3.

When the two cars are brought together, the inclined sides of the heads B come against each other, and the heads turn on their pivots until the hooks or shoulders *a a* have passed each other, when the springs D D throw them out again to engage with each other. The outer end of the arm C, is by a chain, *b*, connected with the lower end of a lever, E, which is pivoted on the end of the car, and by means of which the cars are readily uncoupled from the top of freight-cars, as shown, or from the platform of passenger-cars. To the bumper A is also connected a pin, *d*, by means of a chain, *e*, for coupling with the ordinary link, if so desired. This pin may also be inserted in the space marked *x*, in Fig. 3, for holding the head B, when desired, so as not to turn on its pivot. At the rear end of the bumper is arranged a spring, G, so that the bumper will yield when the cars are brought together, and lessen the concussion.

Having thus fully described my invention, what I claim as new, and desire to secure by Letters Patent, is—

The draw-bar or bumper A, having the pivoted head B with arm C, in combination with the spring D, lever E, and chain *b*, all constructed and arranged substantially as and for the purposes set forth.

In testimony that I claim the foregoing I have hereunto set my hand this 12th day of March, 1873.

THOMAS SMITH.

Witnesses:
  G. H. LEE,
  WM. H. DENNIS.